(12) United States Patent
Takashima

(10) Patent No.: US 10,700,577 B2
(45) Date of Patent: Jun. 30, 2020

(54) COOLING STRUCTURE OF POWER TRANSMISSION DEVICE

(71) Applicant: Honda Motor Co., Ltd., Tokyo (JP)

(72) Inventor: Taro Takashima, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/360,028

(22) Filed: Mar. 21, 2019

(65) Prior Publication Data

US 2019/0296613 A1 Sep. 26, 2019

(30) Foreign Application Priority Data

Mar. 23, 2018 (JP) .................. 2018-056085

(51) Int. Cl.
  *H02K 9/19* (2006.01)
  *H02K 7/00* (2006.01)
  *H02K 7/116* (2006.01)
  *H02K 21/14* (2006.01)
  *H02K 7/08* (2006.01)

(52) U.S. Cl.
  CPC .............. *H02K 9/19* (2013.01); *H02K 7/006* (2013.01); *H02K 7/083* (2013.01); *H02K 7/116* (2013.01); *H02K 21/14* (2013.01)

(58) Field of Classification Search
  CPC .............. H02K 7/14; H02K 9/19; H02K 5/15
  USPC ............................ 310/52, 54, 58–59, 62–63
  See application file for complete search history.

(56) References Cited

U.S. PATENT DOCUMENTS

| | | | | |
|---|---|---|---|---|
| 1,779,797 A | * | 10/1930 | Baum | H02K 9/19 310/54 |
| 2,214,086 A | * | 9/1940 | Rataiczak | F04B 39/123 62/113 |
| 2,285,960 A | * | 6/1942 | Fechheimer | H02K 9/197 310/54 |
| 2,381,122 A | * | 8/1945 | Fechheimer | H02K 9/197 310/61 |
| RE24,802 E | * | 3/1960 | Kocher et al. | F25B 31/006 62/475 |
| 2011/0076165 A1 | * | 3/2011 | Atarashi | B60K 6/26 417/321 |
| 2013/0151057 A1 | * | 6/2013 | Matsubara | H02K 9/19 701/22 |
| 2017/0167591 A1 | * | 6/2017 | Fujii | B60K 6/445 |

FOREIGN PATENT DOCUMENTS

| | | |
|---|---|---|
| JP | 2011080408 | 4/2011 |
| JP | 2013100847 | 5/2013 |

\* cited by examiner

*Primary Examiner* — Jose A Gonzalez Quinones
(74) *Attorney, Agent, or Firm* — JCIPRNET

(57) ABSTRACT

There is provided a cooling structure of a power transmission device 1 that the power transmission device includes a tubular input shaft 3 and an output shaft 4R that is inserted into and disposed inside the input shaft 3, and that the power transmission device delivers power output from an electric motor (drive source) 2 to the input shaft 3 to the output shaft 4R via a deceleration mechanism T and a differential device D, wherein the output shaft 4R is disposed such that the output shaft 4R is offset relative to a shaft center of the input shaft 3 in a radial direction, and an oil supply pipe 12 is disposed in an axial direction in a wide space that is formed on a side opposite to an offset side of the output shaft 4R in a space S between the output shaft 4R and the input shaft 3.

4 Claims, 5 Drawing Sheets

COOLING STRUCTURE OF POWER TRANSMISSION DEVICE

CROSS-REFERENCE TO RELATED APPLICATION

This application claims the priority of Japan patent application serial no. 2018-056085, filed on Mar. 23, 2018. The entirety of the above-mentioned patent application is hereby incorporated by reference herein and made a part of this specification.

BACKGROUND

Technical Field

The disclosure relates to a cooling structure of a power transmission device.

Description of Related Art

For example, some electric vehicles (EV vehicles) that use electric motors (motors) as drive sources have power transmission devices that include input shafts and output shafts with internal and external double-shaft structures mounted therein. In such power transmission devices, power output from the drive sources to the input shafts is delivered to the output shafts via deceleration mechanisms and differential devices, and it is necessary to cool rotors of electric motors with oil or the like since magnets incorporated in the rotors generate heat due to energization. Note that Patent Document 1 proposes a lubricant device that supplies compressed air to a lubricant oil to prevent dropping of the lubricant oil, and Patent Document 2 proposes an oil path connection structure that prevents oil leakage.

Incidentally, a cooling structure for cooling a rotor of an electric motor in a power transmission device in which an input shaft and an output shaft are disposed coaxially as illustrated in FIG. 6 is known in the related art.

That is, FIG. 6 is a diagram schematically illustrating the cooling structure in the related art, and in the cooling structure illustrated in the drawing, an oil chamber S1 that is sectioned by a sealing member 130 is formed between a cylindrical input shaft (rotor shaft) 103 that rotates with a rotor 102a of an electric motor and an output shaft 104 that is inserted coaxially into the input shaft 103, and cooling oil is supplied to the oil chamber S1. Then, the oil flows to a magnet portion 102a1 that is a heat generation portion in the rotor 102a as illustrated by the arrow and cools the magnet portion 102a1.

However, in the cooling structure in the related art as illustrated in FIG. 6, power loss occurs due to friction caused by sliding contact between the output shaft 104 and the sealing member 130 and viscosity resistance of oil between the input shaft 103 and the output shaft 104 that rotate relative to each other.

Thus, a cooling structure illustrated in FIGS. 7 and 8 is also employed.

That is, FIG. 7 is a schematic diagram illustrating another example of a cooling structure in the related art, and FIG. 8 is a sectional view taken along D-D in FIG. 7. In the cooling structure in the drawing, an oil supply pipe 212 is disposed in an axial direction (the left-right direction in FIG. 7) in a cylindrical space S formed between an input shaft 203 and an output shaft 204 that are disposed coaxially, oil that is fed from an oil pump, which is not illustrated in the drawing, in a compressed manner is ejected from a tip end of the oil supply pipe 212 and supplied to a rotor 202a of an electric motor as illustrated by the arrow in FIG. 7, and a magnet portion 202a1 that is a heat generation portion of the rotor 202a is cooled by the oil. According to such a cooling structure, the aforementioned problems in the cooling structure illustrated in FIG. 6 are solved.

RELATED ART

Patent Documents

[Patent Document 1] Japanese Unexamined Patent Application Publication No. 2011-080408
[Patent Document 2] Japanese Unexamined Patent Application Publication No. 2013-100847

However, the cooling structure in the related art illustrated in FIGS. 7 and 8 has a problem that an inner diameter D2 of the input shaft 203 increases and it is not possible to save space since a space for disposing the oil supply pipe 212 is needed in the space S between the input shaft 203 and the output shaft 204.

SUMMARY

The disclosure provides a cooling structure of a power transmission device (1) that the power transmission device (1) includes a tubular input shaft (3) and an output shaft (4R) that is inserted into and disposed inside the input shaft (3), and that the power transmission device (1) delivers power output from a drive source to the input shaft (3) to the output shaft (4R) via a deceleration mechanism (T) and a differential device (D), the output shaft (4R) is disposed such that the output shaft (4R) is offset relative to a shaft center of the input shaft (3) in a radial direction, and an oil supply pipe (12) is disposed in an axial direction in a wide space that is formed on a side opposite to an offset side of the output shaft (4R) in a space (S) between the output shaft (4R) and the input shaft (3).

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DESCRIPTION OF THE EMBODIMENTS

Hereinafter, embodiments of the disclosure will be described with reference to the accompanying drawings.

Figure 1:
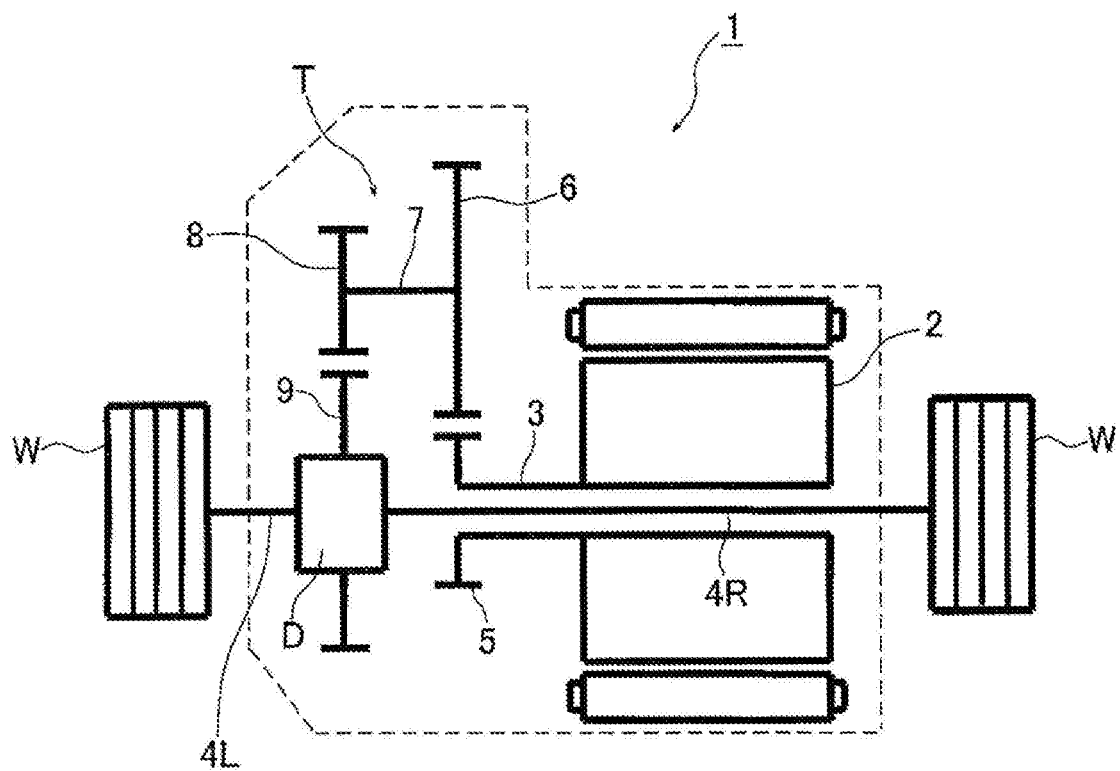
FIG. 1 is a schematic view of a power transmission device that includes a cooling structure according to the disclosure.

FIG. 1 is a schematic view of a power transmission device that includes a cooling structure according to the disclosure, and the power transmission device 1 illustrated in the drawing is mounted in an electric vehicle (EV vehicle) that uses an electric motor 2 as a drive source. The power transmission device 1 includes a tubular input shaft (rotor shaft) 3 and left and right solid output shafts (vehicle shafts) 4L and 4R that are inserted into and disposed inside the input shaft 3, and power output from the electric motor 2 to the input shaft 3 is delivered to the left and right output shafts (vehicle shafts) 4L and 4R via a deceleration mechanism T and a differential device D to rotate and drive each of the left and right driving wheels W attached to ends of the left and right output shafts 4L and 4R.

Here, the deceleration mechanism T is configured of a small-diameter gear 5 that is attached to one end of the input shaft 3 in an axial direction (the left end in FIG. 1), a large-diameter gear 6 that is meshed with the gear 5, a small-diameter gear 8 that is secured to an end of an intermediate shaft 7 in the axial direction (the left end in FIG. 1) to which the gear 6 is secured, and a large-diameter ring gear 9 that is meshed with the gear 8, and the ring gear 9 is secured to an outer periphery of a gear case of the differential device D that can rotate and is not illustrated in the drawing. Also, the gear 5, the gear 6, the gear 8, and the ring gear 9 that mesh with each other form a two-stage deceleration gear array.

In the power transmission device 1 configured as described above, rotation of the electric motor 2 is decelerated in two stages via the deceleration mechanism T and is then delivered from the input shaft 3 to the differential device D. More specifically, the rotation of the input shaft 3 is decelerated via the gear 5 and the gear 6 that are meshed with each other and is then delivered to the intermediate shaft 7, and rotation of the intermediate shaft 7 is decelerated via the gear 8 and the ring gear 9 that are meshed with each other and is then delivered to the differential device D. Then, the rotation delivered to the differential device D is delivered to each of the left and right output shafts 4L and 4R, and the left and right driving wheels W attached to the left and right output shafts 4L and 4R are driven and rotated. Note that a rotation difference between the left and right driving wheels W (a difference between moving distances of the left and right driving wheels W) occurring at the time of cornering of the electric vehicle is absorbed by the differential device D, and the electric vehicle can perform smooth cornering.

Next, the cooling structure according to the disclosure will be described below with reference to FIGS. 2 to 5.

Figure 2:
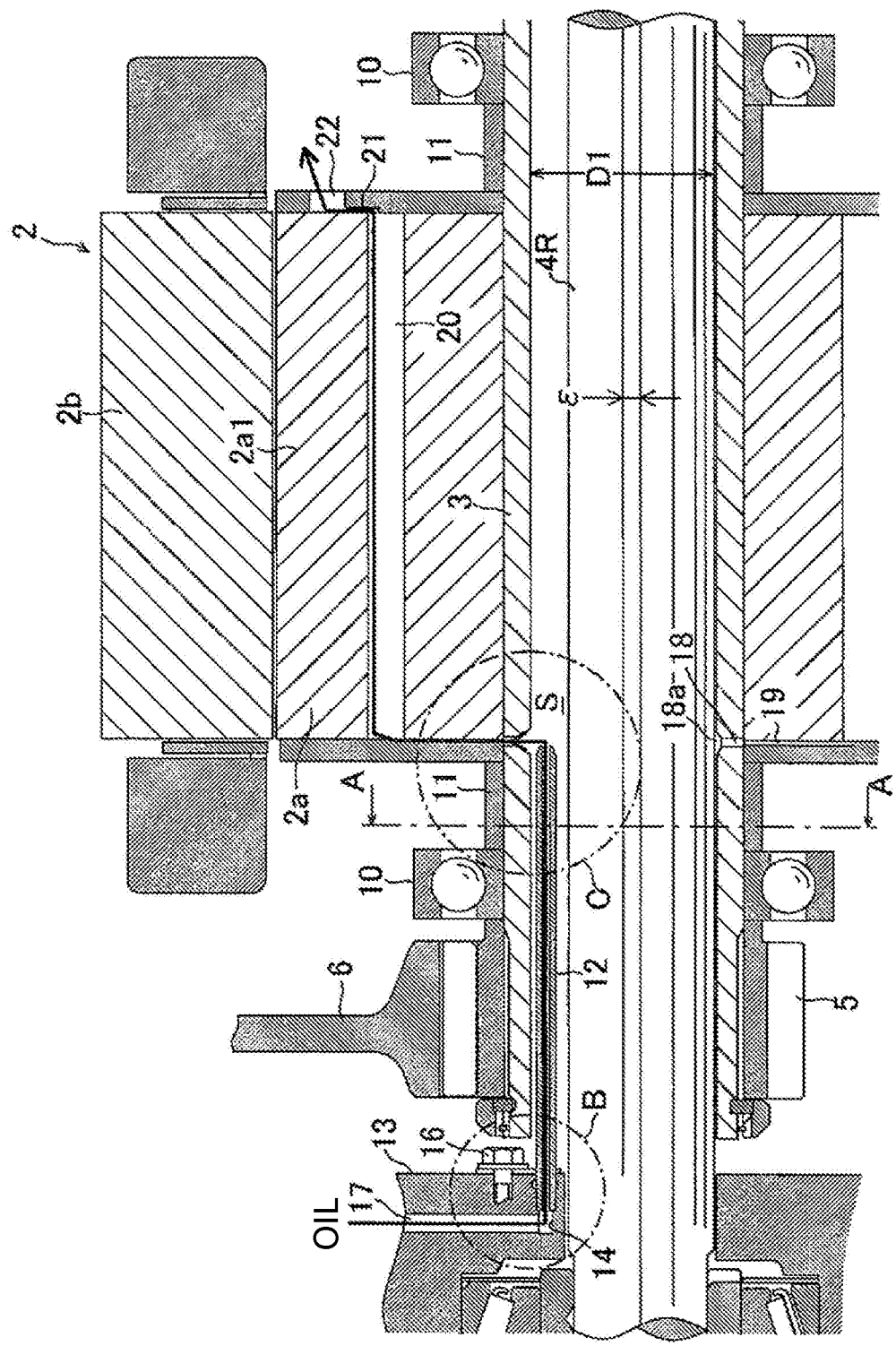
FIG. 2 is a partial sectional view illustrating the cooling structure of a power transmission device according to the disclosure.
Figure 3:
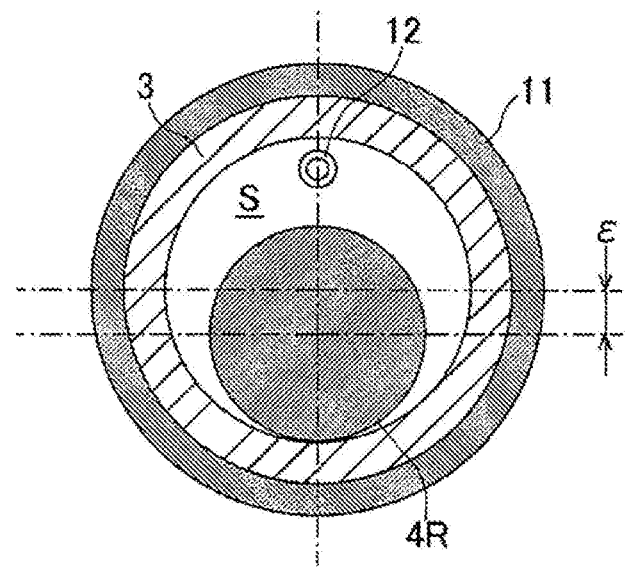
FIG. 3 is a sectional view taken along the line A-A in FIG. 2.
Figure 4:
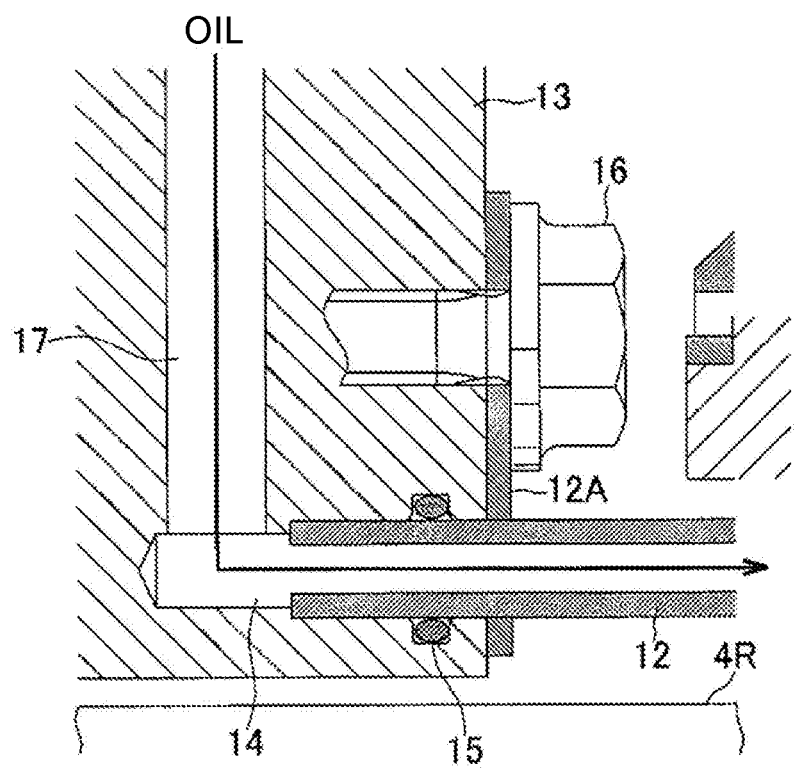
FIG. 4 is an enlarged detailed view of the portion B in FIG. 2.
Figure 5:
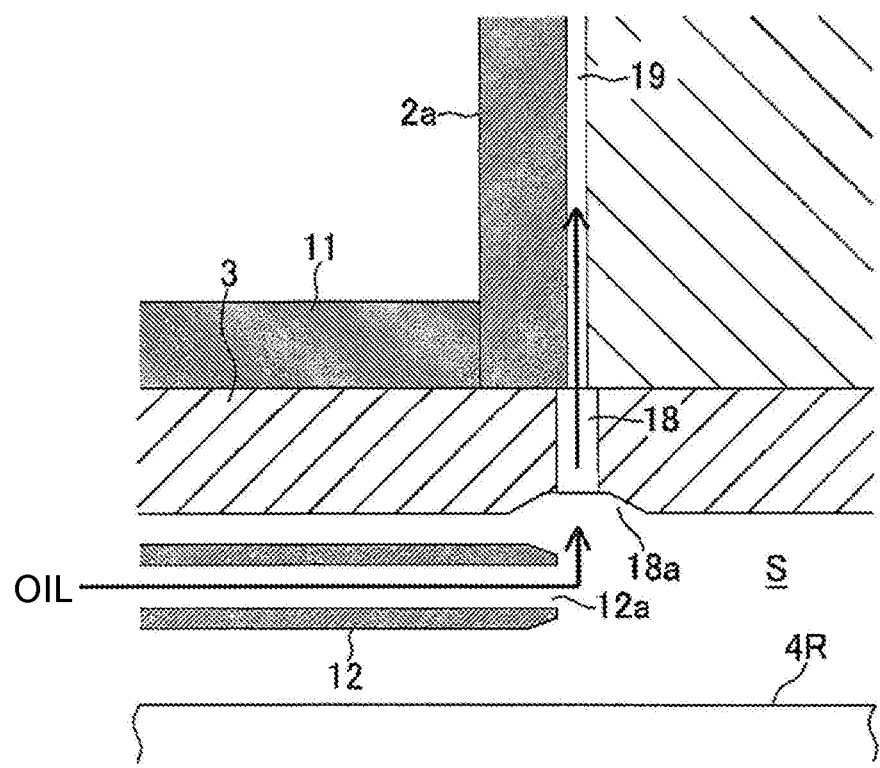
FIG. 5 is an enlarged detailed view of the portion C in FIG. 2.

FIG. 2 is a partial sectional view illustrating the cooling structure of a power transmission device according to the disclosure, FIG. 3 is a sectional view taken along the line A-A in FIG. 2, FIG. 4 is an enlarged detailed view of the portion B in FIG. 2, and FIG. 5 is an enlarged detailed view of the portion C in FIG. 2. The arrows in FIG. 2, FIG. 4, and FIG. 5 are the flow of the oil.

The cooling structure according to the disclosure is adapted to cool the rotor 2a (mainly, a magnet portion 2a1 that is a heat generation portion) of the electric motor 2 with the cooling oil. In the embodiment, the solid output shaft (vehicle shaft) 4R is disposed such that the output shaft 4R is offset in the radial direction (the lower side in FIGS. 2 and 3) by E in the drawing relative to the shaft center of the tubular input shaft (rotor shaft) 3 that penetrates through the center of the rotor 2a of the electric motor 2 and rotates with the rotor 2a as illustrated in FIGS. 2 and 3. Here, the electric motor 2 is formed of a three-phase brushless motor in the embodiment and includes the solid rotor 2a that is rotatably accommodated in a motor case (not illustrated) thereof and a ring-shaped stator 2b that is fixedly provided near the rotor 2a. In addition, a plurality of permanent magnets are incorporated in the rotor 2a, and coils corresponding to three phases are wound around the stator 2b.

Note that, as illustrated in FIG. 2, the input shaft (rotor shaft) 3 is rotatably supported at the motor case, which is not illustrated in the drawing, by ball bearings 10 at two left and right locations with the rotor 2a interposed therebetween, the small-diameter gear 5 (see FIG. 1) is attached to one end in the axial direction (the left end in FIG. 2), and the large-diameter gear 6 (see FIG. 1) is meshed with the gear 5. Also, the left and right ball bearings 10 are positioned in the axial direction at the outer periphery of the input shaft 3 by a tubular distance piece 11.

Incidentally, the cylindrical space S is formed between the input shaft 3 and the output shaft 4R that have an internal and external double-shaft structure. In the embodiment, since the output shaft 4R is disposed to be offset in the radial direction (the lower side in FIGS. 2 and 3) by e illustrated in the drawing relative to the shaft center of the input shaft 3 as described above, a wide space is secured in the space S on the side of the output shaft 4R opposite to the offset side (the upper side in FIGS. 2 and 3). Therefore, the oil supply pipe 12 is disposed in the axial direction (the left-right direction in FIG. 2) at a portion (the upper portion in FIGS. 2 and 3) at which the wide space is secured in the space S in the embodiment.

One end of the oil supply pipe 12 in the axial direction extending to the outside of the input shaft 3 (the left end in FIG. 2) is inserted and fitted into a horizontally formed oil path 14 in a case 13 as illustrated in detail in FIG. 4, and the inserted and fitted portion is sealed with an O ring 15 fitted to the case 13. In addition, the oil supply pipe 12 is secured to the case 13 by attaching a flange 12A secured to the outer periphery thereof to the case 13 with a bolt 16. Note that an oil path 17 formed in the vertical direction (the upward-downward direction in FIG. 4) communicates with the horizontal oil path 14 formed in the case 13, and the oil path 17 in the vertical direction is connected on the ejection side of an oil pump port that is driven by some of the power of the electric motor 2 and is not illustrated in the drawing.

In addition, a tip end of the oil supply pipe 12 (the right end in FIG. 2) opens as an oil ejection port 12a to the space S between the input shaft 3 and the output shaft 4R, and a plurality of circular oil holes 18 (only one oil hole 18 is illustrated in FIG. 5) are provided in the radial direction (the upward-downward direction in FIGS. 2 and 5) at locations of the input shaft 3 that are close to the oil ejection port 12a such that the oil holes 18 penetrate therethrough as illustrated in FIGS. 2 and 5. Note that the plurality of oil holes 18 are formed at an equal angular pitch in the circumferential direction of the input shaft 3.

In addition, truncated cone-shaped guide grooves 18a with diameters increasing toward the inside in the radial direction (the lower side in FIG. 5) are formed at circumferential edges, at which the respective oil holes 18 open, of the inner periphery of the input shaft 3 as illustrated in FIG. 5. Also, a plurality of oil paths 19 (only two oil paths 19 are illustrated in FIG. 2) communicating with the plurality of oil holes 18 are radially formed in the radial direction (the upward-downward direction in FIG. 2) on one side (the left side in FIG. 2) of the rotor 2a of the electric motor 2, and these oil paths 19 communicate with a plurality of (the same number as the numbers of the oil holes 18 and the oil paths 19) oil paths 20 penetrating through the rotor 2a in the axial direction (the left-right direction in FIG. 2). In addition, the oil paths 20 communicate with the oil paths 21 that are formed on the other side (the right side in FIG. 2) of the rotor 2a and with the plurality of circular oil holes 22 that open in the oil paths 21.

If the electric motor 2 is activated and an oil pump, which is not illustrated in the drawing, is driven by a portion of the power in the cooling structure configured as described above, the oil with a pressure raised by the oil pump passes through the oil paths 17 and 14 of the case 13 as illustrated by the arrow in FIG. 2 and is then supplied to the oil supply pipe 12. Then, the oil supplied to the oil supply pipe 12 flows in the axial direction in the oil supply pipe 12 and is ejected from the oil ejection port 12a that opens at the tip end of the oil supply pipe 12. At this time, since the pressure near the guide groove 18a of the input shaft 3 is a negative pressure due to centrifugal force of the rotation of the input shaft 3, the oil ejected from the oil ejection port 12a of the oil supply pipe 12 is introduced from the guide groove 18a into the oil holes 18 by being attracted by the negative pressure. Note that, since the guide groove 18a has a tapered shape (truncated cone shape) that opens toward the oil ejection port 12a at the tip end of the oil supply pipe 12 at this time, the oil ejected from the oil ejection port 12a is efficiently received by the guide groove 18a and is guided to the oil hole 18.

If the oil is guided to the oil holes 18 of the input shaft 3 as described above, the oil that rotates with the input shaft 3 flows into the oil path 19 that is formed at the rotor 2a of the electric motor 2 due to centrifugal force acting on the oil. Then, since the oil flowing into the oil path 19 of the rotor 2a rotates with the rotor 2a, the oil flows toward the outside (the upper side in FIGS. 2 and 5) in the radial direction due to the centrifugal force, flows from the oil path 19 to the oil path 20 of the rotor 2a as illustrated by the arrow in FIG. 2, flows in the axial direction along the oil path 20, passes through the oil path 21 of the rotor 2a, and is finally discharged from the oil hole 22 to the outside of the rotor 2a.

Since the magnet portion 2a1 that is a heat generation portion in the rotor 2a of the electric motor 2 is cooled by the oil flowing through the oil paths 19, 20, and 21 formed in the rotor 2a by the aforementioned actions being continuously repeated, the temperature rise is curbed, and as a result, high operation stability and durability are secured for the electric motor 2.

Figure 7:
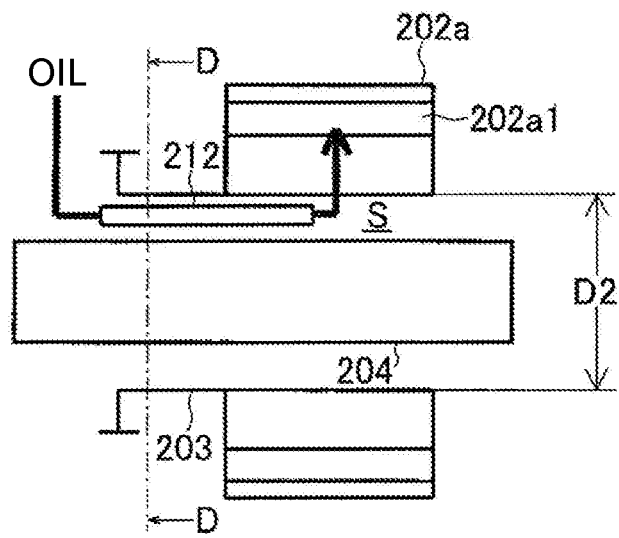
FIG. 7 is a schematic view illustrating another example of a cooling structure of a power transmission device in the related art.
Figure 8:
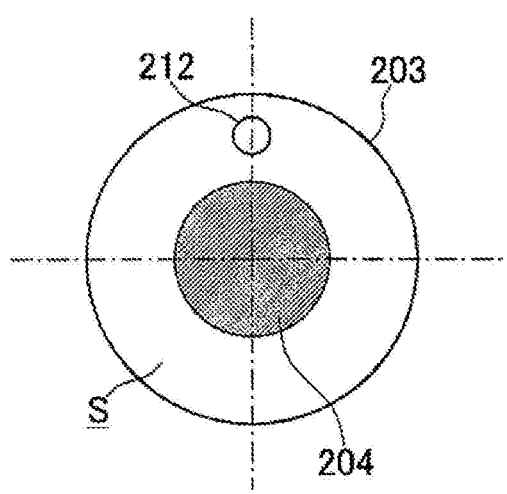
FIG. 8 is a sectional view taken along the line D-D in FIG. 7.

As described above, since the output shaft 4R is disposed such that the output shaft 4R is offset by ε in the radial direction relative to the shaft center of the input shaft 3, and the oil supply pipe 12 is disposed in the axial direction in the wide space that is formed on the side of the output shaft 4R opposite to the offset side in the space S between the output shaft 4R and the input shaft 3 in the cooling structure according to the embodiment, it is possible to set the inner diameter D1 of the input shaft 3 to be smaller than the inner diameter D2 of the input shaft 203 (D1<D2) in the cooling structure (in which the oil supply pipe 212 is disposed in the space S in which the input shaft 203 and the output shaft 204 that are disposed coaxially) in the related art as illustrated in FIGS. 7 and 8 and to thereby save the space.

Figure 6:
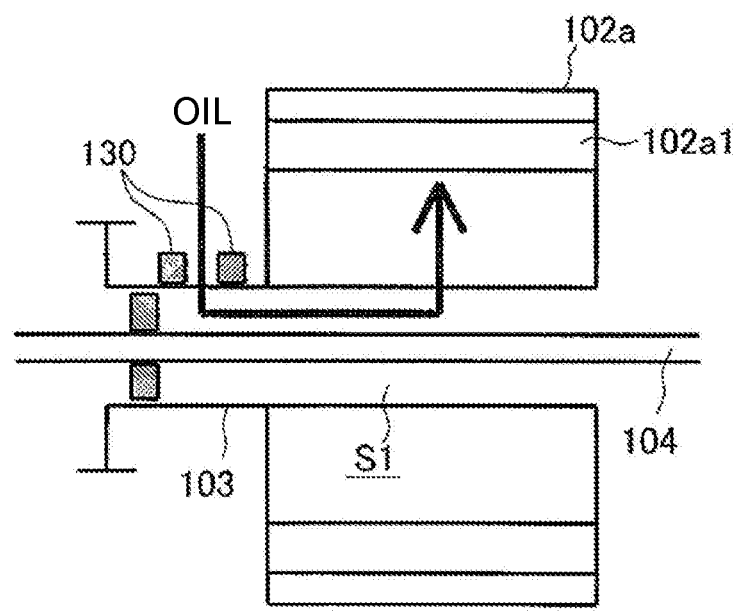
FIG. 6 is a schematic view illustrating a cooling structure of a power transmission device in the related art.

In addition, since it is not necessary to provide the sealing member 130, which is used in the cooling structure in the related art as illustrated in FIG. 6, in the cooling structure according to the embodiment, the problem of reflection due to sliding contact of the output shaft 104 against the sealing member 130, which occurs in the cooling structure in the related art, does not occur.

Further, since the oil is caused to flow into the oil supply pipe 12 secured to the case 13 in the cooling structure according to the embodiment, and there is no oil between the input shaft 103 and the output shaft 104, with which the oil rotates relative to each other, unlike the cooling structure in the related art as illustrated in FIG. 6, viscosity resistance due to stirring of the oil does not occur. Therefore, according to the cooling structure of the embodiment, it is possible to effectively cool the magnet portion 2a1, which is a heat generation portion, of the rotor 2a of the electric motor 2 by oil without power loss due to friction and viscosity resistance and to curb the temperature rise to be low.

Note that although the embodiment in which the disclosure is applied to the cooling structure for cooling the rotor of the electric motor of the power transmission device that uses the electric motor as the drive source has been described above, the disclosure can similarly be applied to the cooling structure for cooling elements other than the rotor of the electric motor of the power transmission device that uses both the electric motor and the engine as drive sources or the power transmission device that uses only the engine as a drive source.

In addition, the disclosure is not limited to the aforementioned embodiment, and various modifications can be made within the scope of the claims and the scope of the technical ideas described in the specification and the drawings.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

The disclosure provides a cooling structure of a power transmission device capable of saving space without power loss.

According to the cooling structure of the disclosure, since the output shaft is disposed such that the output shaft is offset relative to the shaft center of the input shaft in the radial direction, and the oil supply pipe is disposed in the axial direction in the wide space that is formed on the side of the output shaft opposite to the offset side in the space between the output shaft and the input shaft, it is possible to reduce the inner diameter of the input shaft to a small inner diameter and to thereby save space.

In the cooling structure according to the disclosure, since it is not necessary to provide a sealing member for sectioning the space between the input shaft and the output shaft, a problem of friction due to sliding contact of the output shaft against the sealing member does not occur. Further, since oil is caused to flow in the secured oil supply pipe, viscosity resistance of the oil between the input shaft and the output shaft that rotate relative to each other does not occur. Therefore, according to the cooling structure of the disclosure, it is possible to save space without power loss due to the friction and the viscosity resistance.

In addition, according to the disclosure, the drive source may be an electric motor (2), and a rotor (2a) of the electric motor (2) may be cooled by oil ejected from the oil supply pipe (12).

In addition, according to the disclosure, a plurality of oil holes (18) penetrating in the radial direction may be formed in a peripheral direction in a vicinity of the input shaft (3) where the vicinity of the input shaft (3) is near an oil ejection port (12a) that opens at a tip end of the oil supply pipe (12), and a plurality of oil paths (19) communicating with the oil holes (18) may be formed in the radial direction at the rotor (2a) of the electric motor (2).

In addition, according to the disclosure, a truncated cone-shaped guide groove (18a) expanding toward an inside in the radial direction in an inner periphery of the input shaft (3) where the inner periphery of the input shaft (3) may be formed at a peripheral edge at the oil holes (18) of the input shaft (3).

According to the disclosure, it is possible to save space for the cooling structure of a power transmission device without power loss.

What is claimed is:

1. A cooling structure of a power transmission device that the power transmission device includes a tubular input shaft and an output shaft that is inserted into and disposed inside the input shaft, and that the power transmission device delivers power output from a drive source to the input shaft to the output shaft via a deceleration mechanism and a differential device,
   wherein the output shaft is disposed such that the output shaft is offset relative to a shaft center of the input shaft in a radial direction, and an oil supply pipe is disposed in an axial direction in a wide space that is formed on a side opposite to an offset side of the output shaft in a space between the output shaft and the input shaft.

2. The cooling structure of a power transmission device according to claim 1, wherein the drive source is an electric motor, and a rotor of the electric motor is cooled by oil ejected from the oil supply pipe.

3. The cooling structure of a power transmission device according to claim 2, wherein a plurality of oil holes penetrating in the radial direction are formed in a peripheral direction in a vicinity of the input shaft where the vicinity of the input shaft is near an oil ejection port that opens at a tip end of the oil supply pipe, and a plurality of oil paths communicating with the oil holes are formed in the radial direction at the rotor of the electric motor.

4. The cooling structure of a power transmission device according to claim 3, wherein a truncated cone-shaped guide groove expanding toward an inside in the radial direction in an inner periphery of the input shaft where the inner periphery of the input shaft is formed at a peripheral edge at the oil holes of the input shaft.

* * * * *